(12) United States Patent
Miller et al.

(10) Patent No.: US 11,478,013 B2
(45) Date of Patent: Oct. 25, 2022

(54) BEVERAGE CONTAINER RIMMER

(71) Applicants: Kyle Thomas Miller, Stouffville (CA); Joseph Paul, Stouffville (CA)

(72) Inventors: Kyle Thomas Miller, Stouffville (CA); Joseph Paul, Stouffville (CA)

(73) Assignee: Kyle Thomas Miller, Stouffville (CA)

( * ) Notice: Subject to any disclaimer, the term of this patent is extended or adjusted under 35 U.S.C. 154(b) by 244 days.

(21) Appl. No.: 16/886,904

(22) Filed: May 29, 2020

(65) Prior Publication Data

US 2021/0370337 A1 Dec. 2, 2021

(51) Int. Cl.
| | | |
|---|---|---|
| *A23P 10/10* | (2016.01) | |
| *B05C 1/00* | (2006.01) | |
| *B05C 11/10* | (2006.01) | |
| *A47J 47/00* | (2006.01) | |
| *A47G 19/22* | (2006.01) | |
| *B05C 19/04* | (2006.01) | |
| *A23L 2/56* | (2006.01) | |
| *B67D 3/00* | (2006.01) | |
| *B05C 19/06* | (2006.01) | |
| *B05C 5/02* | (2006.01) | |

(52) U.S. Cl.
CPC ............ *A23P 10/10* (2016.08); *A23L 2/56* (2013.01); *A47G 19/22* (2013.01); *A47J 47/00* (2013.01); *B05C 1/00* (2013.01); *B05C 11/10* (2013.01); *B05C 19/04* (2013.01); *B05C 19/06* (2013.01); *B67D 3/0019* (2013.01); *B67D 3/0029* (2013.01); *B05C 5/0212* (2013.01); *B05C 5/0225* (2013.01)

(58) Field of Classification Search
CPC . A23P 10/10; B05C 1/00; B05C 11/10; B05C 5/0212; B05C 5/0225; B05C 19/04; B05C 19/06; A47G 19/22; A23L 2/56; A47J 47/00; B67D 3/0019; B67D 3/0029; A45D 19/02
USPC ....... 118/13, 16, 24; 222/160; 141/356, 363, 141/365, 366; 401/9–11
See application file for complete search history.

(56) References Cited

U.S. PATENT DOCUMENTS

| | | | |
|---|---|---|---|
| 3,209,796 A | 11/1965 | Silletti | |
| 6,265,010 B1 | 7/2001 | Franco | |
| 6,935,537 B2 * | 8/2005 | Tellez | A47G 19/24 222/548 |
| 6,959,807 B2 * | 11/2005 | Sharon | B65D 81/3211 206/568 |
| 7,942,283 B2 | 5/2011 | Radow | |
| 8,915,391 B2 | 12/2014 | Radow | |

(Continued)

FOREIGN PATENT DOCUMENTS

WO 2016016488 A1 2/2016

*Primary Examiner* — Laura Edwards
(74) *Attorney, Agent, or Firm* — Stratford Group Ltd.

(57) ABSTRACT

A beverage container rimmer is provided. A beverage container rimmer device for applying garnish to an outer rim of a beverage container, the beverage container rimmer comprising an inner compartment surrounded by a first compartment and a second compartment. The first compartment housing a liquid garnish and employing a first application member for applying the liquid garnish to the outer rim of the beverage container. The second compartment housing a granular garnish and employing a second application member for applying the granular garnish to the outer rim of the beverage container.

11 Claims, 4 Drawing Sheets

(56) References Cited

U.S. PATENT DOCUMENTS

| | | |
|---|---|---|
| 2006/0286219 A1 | 12/2006 | Mauldin et al. |
| 2007/0092615 A1 | 4/2007 | Fisk et al. |
| 2008/0000931 A1* | 1/2008 | Tichy .................... A61L 2/238 |
| | | 222/212 |
| 2011/0262761 A1 | 10/2011 | Rivero Kennedy |
| 2012/0114867 A1 | 5/2012 | Quinn |

* cited by examiner

BEVERAGE CONTAINER RIMMER

FIELD OF INVENTION

The present disclosure relates to a beverage container rimmer, more specifically but not by way of limitation, a beverage container rimmer that applies garnish onto the outer rim of a beverage container.

BACKGROUND

Presently, several storage containers exist which provide a user access to a variety of condiments for various drink stylings and garnishing common in bars, restaurants and for personal use. While convenient for a wide range of different drinks, these devices require additional setup and work, as well as prevent multiple uses for the same drinkware in an attempt to avoid cross contamination. Additionally, the few existing devices which dispense the garnish for the user are mechanically complex, are limited in the garnish which can be applied, require arduous maintenance and a technical proficient user to preform repairs and replacement of parts.

U.S. Pat. No. 3,209,796 A (Silletti) discloses a cocktail glass limer which applies lime juice and sugar to the rims of cocktail glasses. Shortcomings include the bulkiness of the cocktail glass limer, require maintenance and replacement of the pressure spray cans and the inability of a 360-degree deployment for the lime juice and sugar.

U.S. Pat. No. 7,942,283 B2 (Radow) discloses a dispenser assembly which houses spice and wetting agents. Shortcomings include an inability to employ the dispenser assembly to dispense the rimming fluid and/or spice onto the rim of the intended drinkware without user aid.

U.S. Pub. No. 2012/0114867 A1 (Quinn) discloses a glass rimming device for providing three drawer compartments with different ingredients used to rim cocktail glasses. Shortcomings include an inability to employ the glass rimming device to dispense the rimming fluid and/or spice onto the rim of the intended drinkware without user aid.

U.S. Pat. No. 8,915,391 B2 (Radow) discloses a drinkware rimming apparatus including a wetting receptacle, a cutout, and a rotatable tray having a plurality of spice receptacles. Shortcomings include an inability to employ the drink-ware rimming apparatus to dispense the rimming fluid and/or spice onto the rim of the intended drink-ware without user aid.

All documents cited herein are incorporated by reference.

There is a need for a beverage container rimmer which can be quickly and effortlessly employed to apply one or more liquid and granular garnishes onto the outer rim of a beverage container, for enhancing the aesthetics and enriching the flavor of a drink.

BRIEF SUMMARY

It is the object of the present invention to provide a beverage container rimmer device for applying garnish to an outer rim of a beverage container, the beverage container rimmer comprising an inner compartment surrounded by a first compartment and a second compartment. The first compartment housing a liquid garnish and employing a first application member for applying the liquid garnish to the rim of the beverage container. The second compartment housing a granular garnish and employing a second application member for applying the granular garnish to the outer rim of the beverage container.

In accordance with an aspect of the invention, there is provided a beverage container rimmer device further comprising a first hatch providing access to the first compartment and an airtight seal when closed. The first application member is one or more first pressure nozzles and the one or more first pressure nozzles are activated by a manually activated first pressure generating component. The first pressure generating component is composed of one or more first air bladders and one or more first valves. A second hatch providing access to the second compartment and an airtight seal when closed. The second application member is one or more second pressure nozzles and the one or more second pressure nozzles are activated by a manually activated second pressure generating component. The second pressure generating component is composed of one or more second air bladders and one or more second valves.

In accordance with an aspect of the invention, there is provided a method of employing the beverage container rimmer to apply the liquid garnish to the outer rim of the beverage container. The method comprising opening the first hatch and inserting the liquid garnish into the first compartment, closing the first hatch and applying the beverage container against the inner compartment such that the one or more first air bladders compress and force the liquid garnish within the first compartment to eject through the one or more first pressure nozzles onto the outer rim of the beverage container.

In accordance with an aspect of the invention, there is provided a method of employing the beverage container rimmer to apply the liquid garnish and the granular garnish to the outer rim of the beverage container. The method comprising opening the first hatch and inserting the liquid garnish into the first compartment. Closing the first hatch and applying the beverage container against the inner compartment such that the one or more first air bladders compress and force the liquid garnish within the first compartment to eject through the one or more first pressure nozzles onto the outer rim of the beverage container. Opening the second hatch and inserting the granular garnish into the second compartment. Closing the second hatch and applying the beverage container against the inner compartment such that the one or more second air bladder compress and force the granular garnish within the second compartment to eject through the one or more second pressure nozzles onto the outer rim of the beverage container.

In accordance with an embodiment of the invention, the device further comprising a first hatch providing access to the first compartment and an airtight seal when closed.

In accordance with an embodiment of the invention, the first application member is one or more first pressure nozzles.

In accordance with an embodiment of the invention, the one or more first pressure nozzles are configured to apply the liquid garnish to the outer rim of the beverage container.

In accordance with an embodiment of the invention, the one or more first pressure nozzles are activated by a manually activated first pressure generating component.

In accordance with an embodiment of the invention, the first pressure generating component is composed of one or more first air bladders and one or more first valves.

In accordance with an embodiment of the invention, the device further comprising a first biasing apparatus for resetting the one or more first air bladders to their original state.

In accordance with an embodiment of the invention, the first biasing means is a spring.

In accordance with an embodiment of the invention, the second biasing means is electrically powered.

In accordance with an embodiment of the invention, the second biasing means is gas powered.

In accordance with an embodiment of the invention, the device further comprising a second hatch providing access to the second compartment and an airtight seal when closed.

In accordance with an embodiment of the invention, the second application member is one or more second pressure nozzles.

In accordance with an embodiment of the invention, the one or more second pressure nozzles are configured to apply the granular garnish to the outer rim of the beverage container.

In accordance with an embodiment of the invention, the one or more second pressure nozzles are activated by a manually activated second pressure generating component.

In accordance with an embodiment of the invention, the second pressure generating component is composed of one or more second air bladders and one or more second valves.

In accordance with an embodiment of the invention, the device further comprising a second biasing apparatus for resetting the one or more second air bladders to their original state.

In accordance with an embodiment of the invention, the second biasing means is a spring.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

Figure 1:
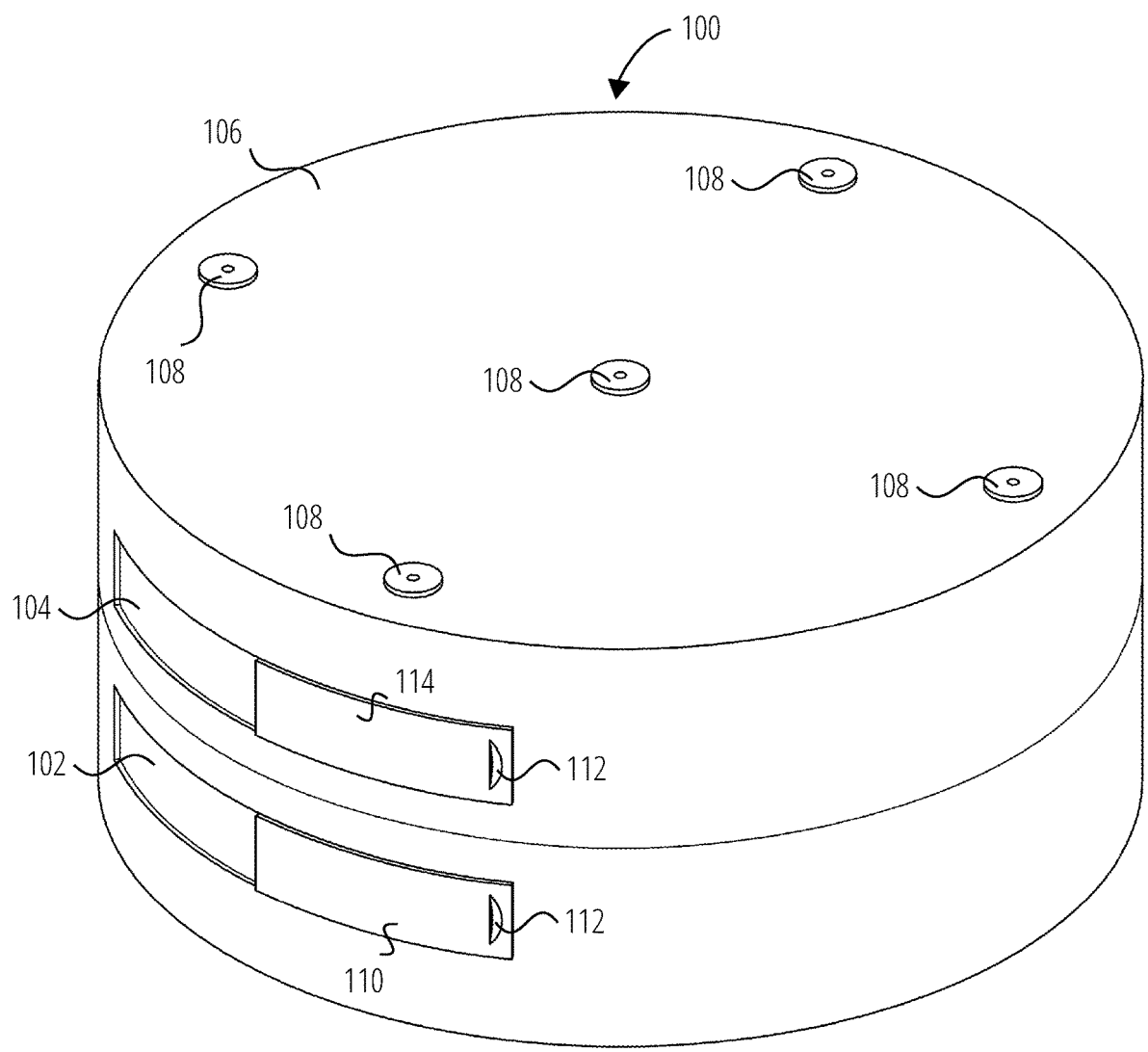
FIG. 1 illustrates a perspective view 100 in accordance with one embodiment.

FIG. 1 depicts a perspective view 100 of the beverage container rimmer as in one embodiment. This embodiment displays a circularly shaped beverage container rimmer where an inner compartment, not presently shown, is cylindrically shaped and a first compartment 102 and a second compartment 104 combine to complete a torus shape. A top portion 106 of the first compartment 102 is shown with a plurality of one-way valves 108 which provide air intake for the beverage container rimmer, such that the one-way valves 108 allow air to enter the beverage container rimmer but not escape.

Figure 2:
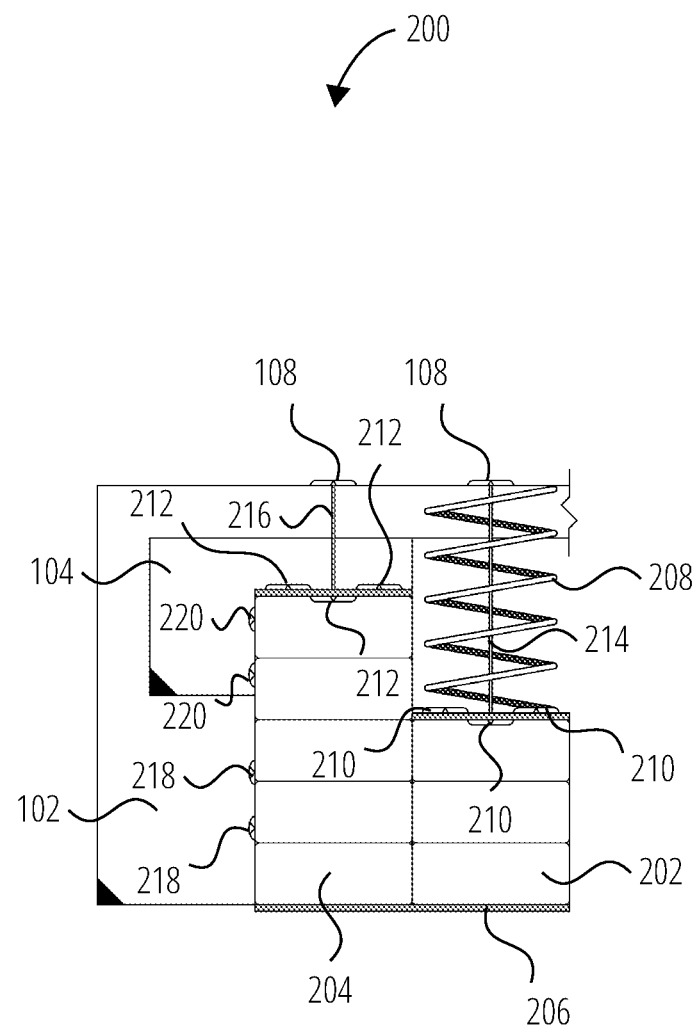
FIG. 2 illustrates a section view 200 in accordance with one embodiment.
Figure 3:
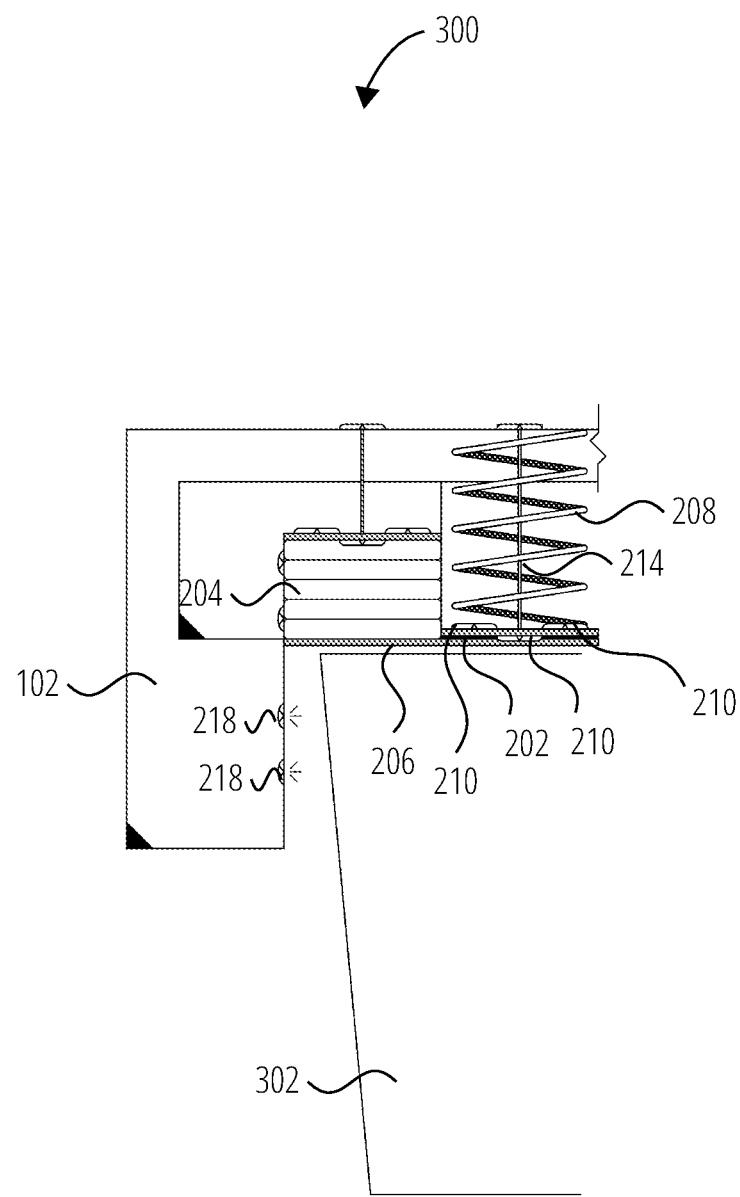
FIG. 3 illustrates a first stage 300 in accordance with one embodiment.

A first hatch 110 is shown slid open horizontally with a groove 112 which act as a grip to aid the user in opening the first hatch 110, providing the user access to the first compartment 102. A second hatch 114 is shown slid open horizontally with a groove 112 which act as a grip to aid the user in opening the second hatch 114, providing the user access to the second compartment 104. In some embodiments, the first hatch 110 and the second hatch 114 may contain a gasket seal to keep the first compartment 102 and the second compartment 104 airtight. The gasket seals may be composed from materials such as, but not limited to, rubber, plastic, metal or silicone. FIG. 2 depicts a section view 200 of the beverage container rimmer as in one embodiment. FIG. 3 depicts a first stage 300 of employment of the beverage container rimmer as in one embodiment.

The beverage container rimmer device may be applied to garnish to an outer rim of a beverage container 302 and comprises an inner compartment surrounded by a first compartment 102 and a second compartment 104. The first compartment 102 houses a liquid garnish and employs a first application member for applying the liquid garnish to the outer rim of the beverage container 302. In some embodiments, the first application member is one or more first pressure nozzles 218. The one or more first pressure nozzles 218 may be configured to apply the liquid garnish to the outer rim of the beverage container 302. In other embodiments, the one or more first pressure nozzles 218 are activated by a manually activated first pressure generating component which may be composed of one or more first air bladders 202 and one or more first valves. A first biasing apparatus may also be employed to reset the one or more first air bladders 202 to their original state. In some embodiments, the first biasing apparatus is a spring 208. In some embodiments, the first biasing apparatus is electrically powered. In some embodiments, the first biasing apparatus is gas powered, for example with compressed air cartridges. In another embodiment, a first hatch 110 provides access to the first compartment 102 and an airtight seal when closed.

The second compartment 104 houses a granular garnish and employs a second application member for applying the granular garnish to the outer rim of the beverage container 302. In some embodiments, the second application member is one or more second pressure nozzles 220. The one or more second pressure nozzles 220 may be configured to apply the granular garnish to the outer rim of the beverage container 302. In other embodiments, the one or more second pressure nozzles 220 are activated by a manually activated second pressure generating component which may be composed of one or more second air bladders 204 and one or more second valves. A second biasing apparatus may also be employed to reset the one or more second air bladders 204 to their original state. In some embodiments, the second biasing apparatus is a spring 208. In another embodiment, a second hatch 114 provides access to the second compartment 104 and an airtight seal when closed.

One or more liquid or granular garnishes may be inserted into the first hatch 110 and the second hatch 114. Typically, the first hatch 110 contains a primer such as, but not limited to, lemon juice, lime juice, orange juice, gomme syrup, simply syrup, maple syrup, caramel sauce, chocolate sauce, or marsh mellow creme, while the second hatch 114 contains a granulated substance such as, but not limited to, salt, white sugar, brown sugar, castor sugar, icing sugar, wasabi sugar, ground coconut, powdered chocolate or chocolate sprinkles.

In some embodiments, the first hatch 110 may be pulled out. In another embodiment, the second hatch 114 may be pulled out. In another embodiment, the first hatch 110 may be slid open. In another embodiment, the second hatch 114 may be slid open. In another embodiment, the first hatch 110 may be swung open. In another embodiment, the second hatch 114 may be swung open. Examples of beverage containers include, but are not limited to, a cup, a glass, a bottle, a mug, a beaker or other such beverage containment device.

The embodiment of FIG. 2 displays a beverage container rimmer comprising an inner compartment surrounded by a first compartment 102 and a second compartment 104. The inner compartment is shown comprising a stage, a first air bladder 202 and a second air bladder 204 wherein the first air bladder 202 and the second air bladder 204 are affixed on top of the stage 206. A spring 208 is shown affixed to the first air bladder 202 and a top portion 106 of the first compartment 102 with a plurality of one-way air valves 108 affixed to the top portion 106 of the first compartment 102 such that air may be drawn into the first compartment 102 but may not escape. A plurality of first two-way air valves 210 are shown affixed to the first air bladder 202 such that air may be drawn into the first air bladder 202 or the first compartment 102. A plurality of second two-way air valves 212 are shown affixed to the second air bladder 204 such that air may be drawn into the second air bladder 204 or the second compartment 104. A first air hose 214 is shown connecting one of the one-way air valves 108 to a first two-way air valve 210 and a second air hose 216 is shown connecting one of the first one-way air valves 108 to a second two-way air valve 212. The second compartment 104 is shown affixed within the first compartment 102 with a first hatch 110 providing access to the first compartment 102 and a second hatch 114 providing access to the second compartment 104. A plurality of first spray nozzles 218 are shown between the first compartment 102 and the inner compartment and a plurality of second spray nozzles 220 are shown between the second compartment 104 and the inner compartment.

In some embodiments, the first compartment 102 and second compartment 104 may be sloped such that the garnish inserted is sloped towards the one or more first pressure nozzles 218 and the one or more second pressure nozzles 220 respectively. The one or more first pressure nozzles 218 and the one or more second spray nozzles 220 are shown oriented such that the garnish within the first compartment 102 and the second compartment 104 may be dispensed out into the inner compartment. The first air bladder 202 and the second air bladder 204 may be composed from flexible materials which allow for compression and expansion such as, but not limited to, latex, rubber or vinyl. The first air bladder 202 and the second air bladder 204 shown in FIG. 2 are in their relaxed state where they are completely inflated.

A method of employing the beverage container rimmer to apply a liquid garnish to the outer rim of a beverage container 302 comprises opening the first hatch 110 and inserting the liquid garnish into the first compartment 102, closing the first hatch 110 and applying the beverage container 302 against the inner compartment such that the one or more first air bladders 202 compress, forcing the liquid garnish within the first compartment 102 to eject through the first pressure nozzle 218 onto the outer rim of the beverage container 302. This method is briefly displayed in FIG. 3 where a beverage container 302 is applied against the stage 206 of the inner compartment such that the stage 206 compresses the first air bladder 202 and the second air bladder 204 forcing the liquid garnish within the first compartment 102 through the first pressure nozzle 218 and onto an outer rim of the user's beverage container 302.

The above method may also further comprise employing the beverage container rimmer to apply a granular garnish to the outer rim of a beverage container 302. This method comprises opening the second hatch 114 and inserting the granular garnish into the second compartment 104, closing the second hatch 114 and applying the beverage container 302 against the inner compartment such that the one or more second air bladders 204 compress, forcing the granular garnish within the second compartment 104 to eject through the one or more second pressure nozzles 220 onto the outer rim of the beverage container 302. The above methods may be performed independently or in succession. This method is briefly displayed in FIG. 4 where a beverage container 302 is further applied to the stage 206 such that the stage 206 further compresses the first air bladder 202 and the second air bladder 204 forcing the granular garnish within the second compartment 104 through the second pressure nozzle 220 and onto an outer rim of the user's beverage container 302.

In the embodiment shown in FIG. 3, a user's beverage container 302 has been applied to the stage 206 of the beverage container rimmer such that the first air bladder 202 has undergone a complete compression, in tandem with the second air bladder 204 and the spring 208 which have undergone a semi-compression. The complete compression of the first air bladder 202 results in expulsion of the air within the first air bladder 202 through the first two-way valves 210 and into the first compartment 102, increasing the air pressure within the first compartment 102. This increase in air pressure prompts the first pressure nozzle 218 to eject the granular garnish contained within the first compartment 102 onto the outer rim of the user's beverage container 302, relieving the increased air pressure within the first compartment 102.

The spring 208 is employed to assist in resetting the first air bladder 202 and the stage 206 to their original positions once the user's beverage container 302 has been removed from the beverage container rimmer and a force is no longer being applied. The first air hose 214 allows for air to be drawn from the one-way valve 108 into the first air bladder 202 after the first air bladder 202 has been compressed. This results in the first air bladder 202 re-inflating and reverting back to its relaxed state.

Figure 4:
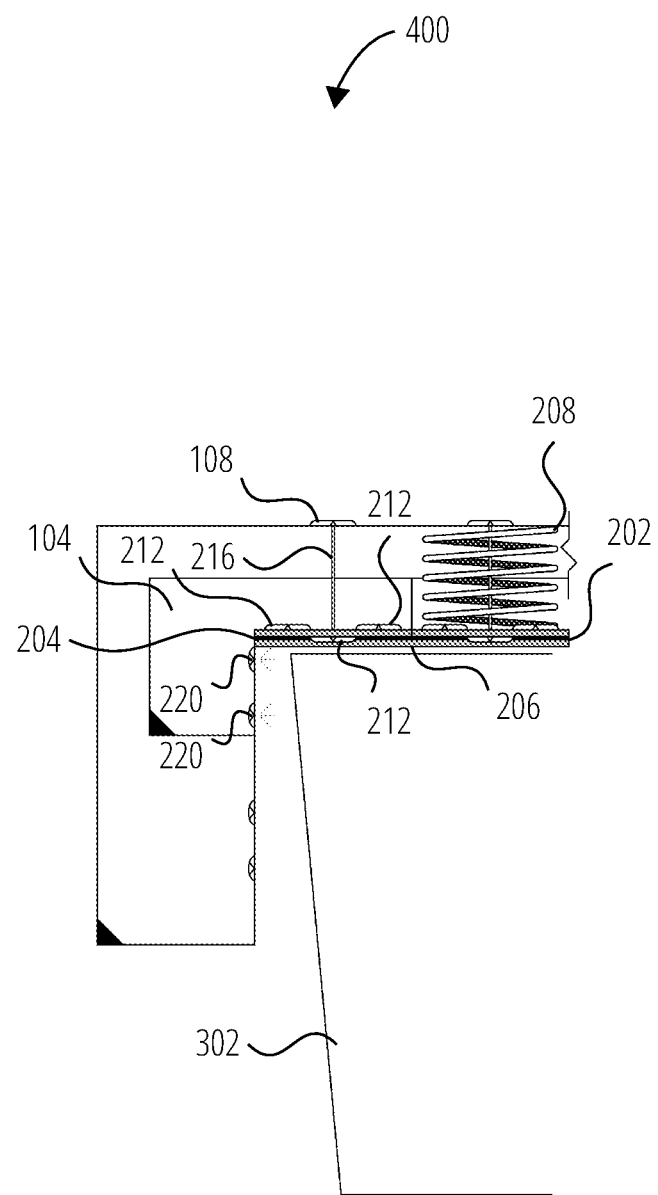
FIG. 4 illustrates a second stage 400 in accordance with one embodiment.

FIG. 4 depicts a second stage 400 of employment of the beverage container rimmer as in one embodiment. In the embodiment shown in FIG. 4, a user's beverage container 302 has been applied to the stage 206 of the beverage container rimmer such that the first air bladder 202, the second air bladder 204 and the spring 208 have undergone a complete compression. The complete compression of the second air bladder 204 results in expulsion of the air within the second air bladder 204 through the second two-way valves 212 and into the second compartment 104, increasing the air pressure within the second compartment 104. This increase in air pressure prompts the second spray nozzles 220 to eject the liquid garnish contained within the second compartment 104 onto the outer rim of the user's beverage container 302, relieving the increased air pressure within the second compartment 104.

The second air hose 216 allows for air to be drawn from the one-way valve 108 into the second air bladder 204 after the second air bladder 204 has been compressed. This results in the second air bladder 204 re-inflating and reverting back to its relaxed state.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A beverage container rimmer device for applying garnish to an outer rim of a beverage container, said beverage container rimmer comprising:
   an inner compartment surrounded by a first compartment and a second compartment;
   said first compartment housing a liquid garnish and employing one or more first pressure nozzles for applying said liquid garnish to said outer rim of said beverage container, wherein said one or more first pressure nozzles are activated by a manually activated first pressure generating component and said first pressure generating component is composed of one or more first air bladders and one or more first valves; and
   said second compartment housing a granular garnish and employing one or more second pressure nozzles for applying said granular garnish to said outer rim of said beverage container, wherein said one or more second pressure nozzles are activated by a manually activated second pressure generating component and said second pressure generating component is composed of one or more second air bladders and one or more second valves.

2. The beverage container rimmer device of claim 1, said device further comprising a first hatch providing access to said first compartment and an airtight seal when closed.

3. The beverage container rimmer device of claim 1, said device further comprising a first biasing apparatus for resetting said one or more first air bladders to a fully expanded state.

4. The beverage container rimmer device of claim 3, wherein said first biasing apparatus is a spring.

5. The beverage container rimmer device of claim 2, said device further comprising a second hatch providing access to said second compartment and an airtight seal when closed.

6. The beverage container rimmer device of claim 3, said device further comprising a second biasing apparatus for resetting said one or more second air bladders to a fully expanded state.

7. The beverage container rimmer device of claim 6, wherein said second biasing apparatus is a spring.

8. The beverage container rimmer device of claim 6, wherein said second biasing apparatus is electrically powered.

9. The beverage container rimmer device of claim 6, wherein said second biasing apparatus is gas powered.

10. A method of applying said liquid garnish to said outer rim of said beverage container rimmer device of claim 3, comprising:
    opening said first hatch and inserting said liquid garnish into said first compartment;
    closing said first hatch; and
    applying said beverage container against said inner compartment such that said one or more first air bladders compress and force said liquid garnish within said first compartment to eject through said one or more first pressure nozzles onto said outer rim of said beverage container.

11. A method of applying said granular garnish to said outer rim of said beverage container rimmer device of claim 5, comprising:
    opening said second hatch and inserting said granular garnish into said second compartment;
    closing said second hatch; and
    applying said beverage container against said inner compartment such that said one or more second air bladder compress and forcing said granular garnish within said second compartment to eject through said one or more second pressure nozzles onto said outer rim of said beverage container.

* * * * *